United States Patent [19]

Charles et al.

[11] Patent Number: 4,983,146
[45] Date of Patent: Jan. 8, 1991

[54] BELT TENSIONING AND QUICK RELEASE DEVICE FOR ELECTROPHOTOGRAPHIC SYSTEM

[75] Inventors: Kirk W. Charles, Atlanta; Danny L. Slayton, Lilburn, both of Ga.

[73] Assignee: Colorocs Corporation, Norcross, Ga.

[21] Appl. No.: 194,927

[22] Filed: May 17, 1988

Related U.S. Application Data

[63] Continuation-in-part of Ser. No. 28,973, Mar. 23, 1987, Pat. No. 4,788,572.

[51] Int. Cl.$^5$ .................................................. G03G 5/00
[52] U.S. Cl. ........................................ 474/117; 355/200; 355/212; 474/138
[58] Field of Search .................. 355/3 BE, 16, 3 R; 198/813, 814, 815; 474/132, 136, 138, 101, 113, 115, 117

[56] References Cited

U.S. PATENT DOCUMENTS

| | | | |
|---|---|---|---|
| 1,086,699 | 2/1914 | Beede | 474/132 |
| 3,500,694 | 3/1970 | Jones et al. | 355/16 X |
| 3,619,050 | 11/1971 | Swanke | 355/16 |
| 4,416,532 | 11/1983 | Rosati | 355/16 X |
| 4,484,485 | 11/1984 | Matsuhisa | 474/117 X |
| 4,527,686 | 7/1985 | Satoh | 355/3 BE X |
| 4,678,354 | 7/1987 | Olsen | 474/113 X |

FOREIGN PATENT DOCUMENTS 0134057  8/1982  Japan .................................... 474/136

OTHER PUBLICATIONS

IBM Technical Disclosure Bulletin, vol. 22 No. 7, Dec. 1979.

Primary Examiner—A. T. Grimley
Assistant Examiner—Robert Beatty
Attorney, Agent, or Firm—Jones, Askew, & Lunsford

[57] ABSTRACT

In an electrophotographic system, a compact, space-efficient device is provided which allows adjustment and quick release of a photosensitive belt. An idler roller supporting the belt is used in conjunction with a cam which provides a take-up feature. A configuration is provided which allows the cam to be disengaged, and the idler roller retracted to facilitate removal of the belt.

2 Claims, 5 Drawing Sheets

BELT TENSIONING AND QUICK RELEASE DEVICE FOR ELECTROPHOTOGRAPHIC SYSTEM

TECHNICAL FIELD

The present invention relates to print engines for electrophotography and particularly discloses an improved endless belt tensioning and quick release device, having a plurality of individual improvements, which maintains tension on endless belts used in such systems and also allows for quick replacement of such belts. This application is a continuation-in-part of and incorporates by reference U.S. application Ser. No. 028,973 U.S. Pat. No. 4,788,572 filed Mar. 23, 1987, entitled "Belt Controls For A Print Engine For Color Electrophotography".

BACKGROUND OF THE INVENTION

Electrophotography is a dry copy process whereby copies of documents are made by setting up an electrostatic image of an original document and transferring that image to copy paper. Also known as xerography, electrophotography has become a standard process for creating copies of documents in a host of environments including offices, educational institutions and the like. The fundamental principles of electrophotography are well known to those skilled in the art.

In more recent years, various systems for color electrophotography have been created. In many respects, the process of color electrophotography is analogous to standard three-color printing processes used in the more conventional printing arts. Conventional three-color printing component images, commonly referred to as color separations, are created by photographing the original through appropriate filters. Each of the separations is in turn made into a separate printing plate. During the printing process, each plate is inked with an appropriate color determined by the filter used in making the original separation. The printing press is adjusted for proper registration—alignment of the separate color component images with each other. Once the press is properly adjusted, multiple copies of the original color image may be faithfully reproduced.

As is known to those skilled in the art, in monochromatic electrophotography an optical image of an original to be copied is focused onto an electrostatic medium. An electrostatic image of the original is formed on the electrostatic medium, or photoreceptor. Toner materials are then brought into contact with the photoreceptor and held in place on the appropriate portions of the electrostatic image by electrostatic forces. The photoreceptor carrying the electrostatic image is brought into contact with an image receptor which, in the most common applications of electrophotography, is a sheet of paper. Electrostatic charging techniques are used to transfer the toner from the photoreceptor to the image receptor. The toner materials are normally plastics which melt at a predetermined temperature and have appropriate color characteristics once they are melted. The image receptor with these toner particles is passed through a fuser, which is a station in the path of the image receptor. The fuser heats the transferred toner and thereby fixes the image onto the image receptor.

In color electrophotography, three separator color filters are typically used to create three separate color component images in a manner analogous to the creation of color separation in color printing. Each image is developed with a toner having the appropriate color characteristics. Each developed color component image is in turn transferred to the image receptor and overlaid upon the previous image to provide a composition image. The image receptor, typically paper, carrying the composite image is then passed through a fuser in a conventional manner.

It is known in the art of color electrophography to include an intermediate transfer medium upon which each developed color component image is deposited, between the above-described photoreceptor and the ultimate image receptor or paper. In this way, a composite developed image is built up, one color component image at a time, until an overlaid composite color image, having portions of all three of the color component toners thereon, is created on the transfer medium. Once this is accomplished, the composite image on the transfer medium is transferred to the paper which then passes through the fuser in the normal fashion. Examples of such systems are shown in U.S. Pat. Nos. 4,652,115 and 4,705,385, both entitled "PRINT ENGINE FOR COLOR ELECTROPHOTOGRAPHY", both incorporated by reference.

It is known in the art to use endless photoreceptive belts to serve as the above-discussed photoreceptors. It is also known to use endless belts for the above-discussed image receptors. These belts are known as photoreceptor belts, and image receptor belts, respectively. The term "endless" is used to denote belts which have no free ends. Such endless belts may be in the form of "seamless" belts which have no identifiable seam, or "seamed" belts which are essentially a length of belt having its end fashioned together by means known in the art, such that the belt is endless, but also has an identifiable seam.

Although such endless belts have several advantages, disadvantages exist in that they may tend to stretch over a period of time. Therefore, a need exists to provide a type of belt tensioning device which will prevent slack from developing in a belt, which results in improper registration, and a risk of damage to the machine.

A need also exists in the art for a device which will allow such endless belts to be readily and withdrawn from the electrophotographic system. As the belts are maintained in tension during operation, it is therefore necessary to provide a device which can quickly release tension on the belt, allowing it to be drawn away from the rollers, and thereafter replaced with the same or a different belt.

From the foregoing, it will be appreciated that a need exists in the art for improved belt tensioning device which maintains desired tension on an endless belt, and also allows endless belts to be readily withdrawn or installed into the device.

SUMMARY OF THE INVENTION

The present invention overcomes the above-stated technical problems in the prior art in a number of significant aspects.

In the present invention, a novel combination of springs and cams are used to maintain a desired tension on the photoreceptor belt and the transfer belt. By maintaining a desired tension on these belts, instantaneous deviations in the length of a particular belt from its optimum length are minimized and consistent and proper registration of images is maintained.

The present invention also allows tension to be quickly and readily removed from the belt to aid belt removal and replacement. The preferred embodiment of the invention allows the cam to be removed from its tensioning position before the rollers are released so that the belt may easily be removed from the rollers. Once a new belt is placed upon the rollers, the method is reversed to place tension upon the new belt, by applying pressure to the roller and then dropping the cam into position so that the roller is held firmly.

Therefore, it is an object of the present invention to provide an improved color electrophotographic machine.

It is a further object of the present invention to provide an improved belt tensioning device to be used in a color electrophotographic machine.

It is a further object of the present invention to maintain consistent and proper registration by keeping a desired tension on the photoreceptor belt and the transfer belt.

Finally, it is further object of the present invention to facilitate belt replacement by providing a mechanism to disengage the constant tension components and then retract the belt-supporting rollers so that the belt may easily be removed and a new belt placed over the rollers.

That the present invention accomplishes these objects and overcomes the drawbacks of the prior art will be appreciated from the detailed description of the preferred embodiment to follow.

DETAILED DESCRIPTION

Turning now to the various drawing figures, in which like numerals reference like parts, a detailed description of the preferred embodiment will be provided.

The improvements recited herein relate to the preferred embodiment of the invention described in patent application Ser. No. 028,973, U.S. Pat. No. 4,788,572 by Palm et al., entitled "BELT CONTROLS FOR A PRINT ENGINE FOR COLOR ELECTROPHOTOGRAPHY", filed Mar. 23, 1987, which specification is incorporated herein by reference.

The preferred embodiment of the invention generally relates to a dual-belt electrostatic transfer system for use in a laser printer or a color electrophotographic copier print engine. The preferred embodiment particularly relates to a device which allows endless photoreceptor or transfer belts to be maintained in desired tension, and also readily removed and replaced. From the following description of the preferred embodiment, it will be appreciated that other alternative embodiments suggest themselves to those skilled in the art.

Figure 1:
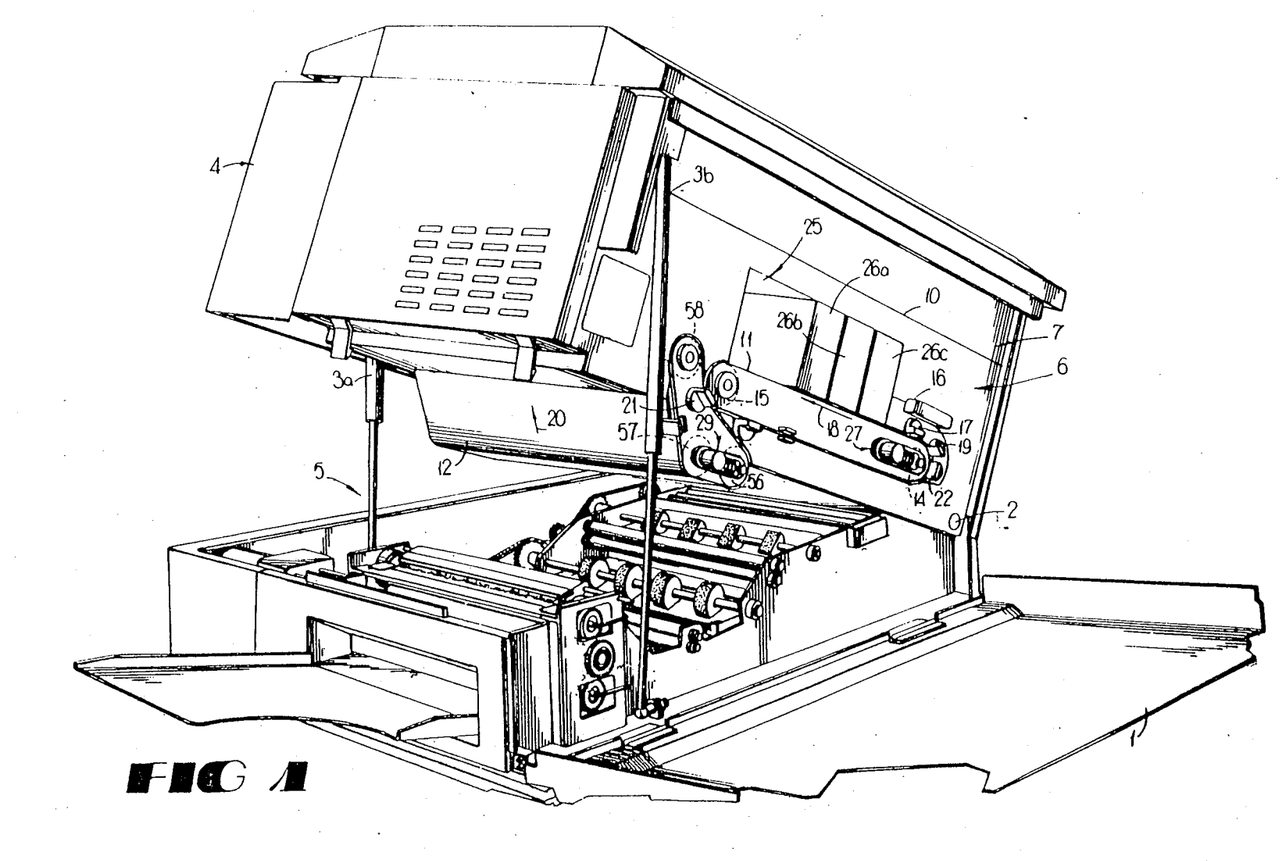
FIG. 1 is a perspective representation of a color electrophotography machine showing the dual belt transfer system.

FIG. 1 shows a perspective view of the color electrophotographic color print engine in which the invention is used. Side panel 1 is lowered, and an upper portion 4 of the machine is raised. The upper portion 4 of the machine is hinged about an axis shown as 2 and is supported by a pair of spring-loaded telescoping rods 3a and 3b. The machine depicted can either be a laser printer or an electrophotographic table top copier. The lower part of the machine is the paper handling assembly, generally indicated at 5. The upper portion of the machine includes an image developing portion 6. In a copier, the machine includes an optical bench 7 joined to the image developing portion 6 at 10.

The image developing portion 6 contains endless photoreceptor belt 11 and endless transfer belt 12. Photoreceptor belt 11 is driven around rollers 14 and 15 by a motor (not shown). Transfer belt 12 is driven around idler rollers 56 and 57, and is driven by drive roller 58 itself driven by a motor (not shown).

A conventional expose station of photoreceptor belt 11 is shown at 16. This includes exposure corona devices 19 and 22 of a type well known to those skilled in the art. Corona devices 19 and 22 are used for providing an electrostatic charge to photoreceptor belt 11. Expose station 16 also includes discharging scorotron 17 to define an electrostatic image on photoreceptor belt 11. Transfer belt 12 wraps around photoreceptor belt 11 where belt 11 wraps around roller 15. Transfer of the developed image from photoreceptor belt 11 to transfer belt 12 occurs in the wrap of belts 11 and 12. In the preferred embodiment, photoreceptor belt 11 rotates in a counterclockwise direction (when looking through lowered side panel 1), as indicated by arrow 18, and transfer belt 12 rotates in a clockwise direction indicated by arrow 20. A corona device is located at position 21 to assist in the transfer of the image from photoreceptor belt 11 to transfer belt 12.

After an image formed on transfer belt 12 is transferred to an image receptor, a transfer belt cleaner blade (not shown) is activated to remove the residual toner from transfer belt 12. The toner is collected in a conventional manner. The image receptor passes into a fuser (see FIG. 1) where the toner is affixed to the image receptor.

Located above photoreceptor belt 11 is an open space 25 for housing toner modules. In the preferred embodiment, space 26 has room for housing toner modules. In FIG. 1, three toner modules 26a through 26c are shown installed within space 25.

A pair of tensioning and belt release devices 27 maintain tension on photoreceptor belt 11 with one device 27 being positioned on each side of the photoreceptor belt path. Likewise, a similar device 29 keeps tension on transfer belt 12. In viewing FIG. 1, only one of each of the devices 27 and 29 may be seen, with the other devices 27, 29 being obscured by the upper portion 4 of the the electrophotographic color print engine.

In the preferred embodiment of the electrophotographic color print engine, photoreceptor belt 11 is approximately 38 inches long and transfer belt 12 is approximately 19 inches long, nominally an integer submultiple of 38 inches. It will now be appreciated from an inspection of FIG. 1 that the use of flexible belts in the preferred embodiment allows a full color print engine to be constructed so that he size approximates that of a conventional convenience monochrome table top copying machine.

Figure 2:
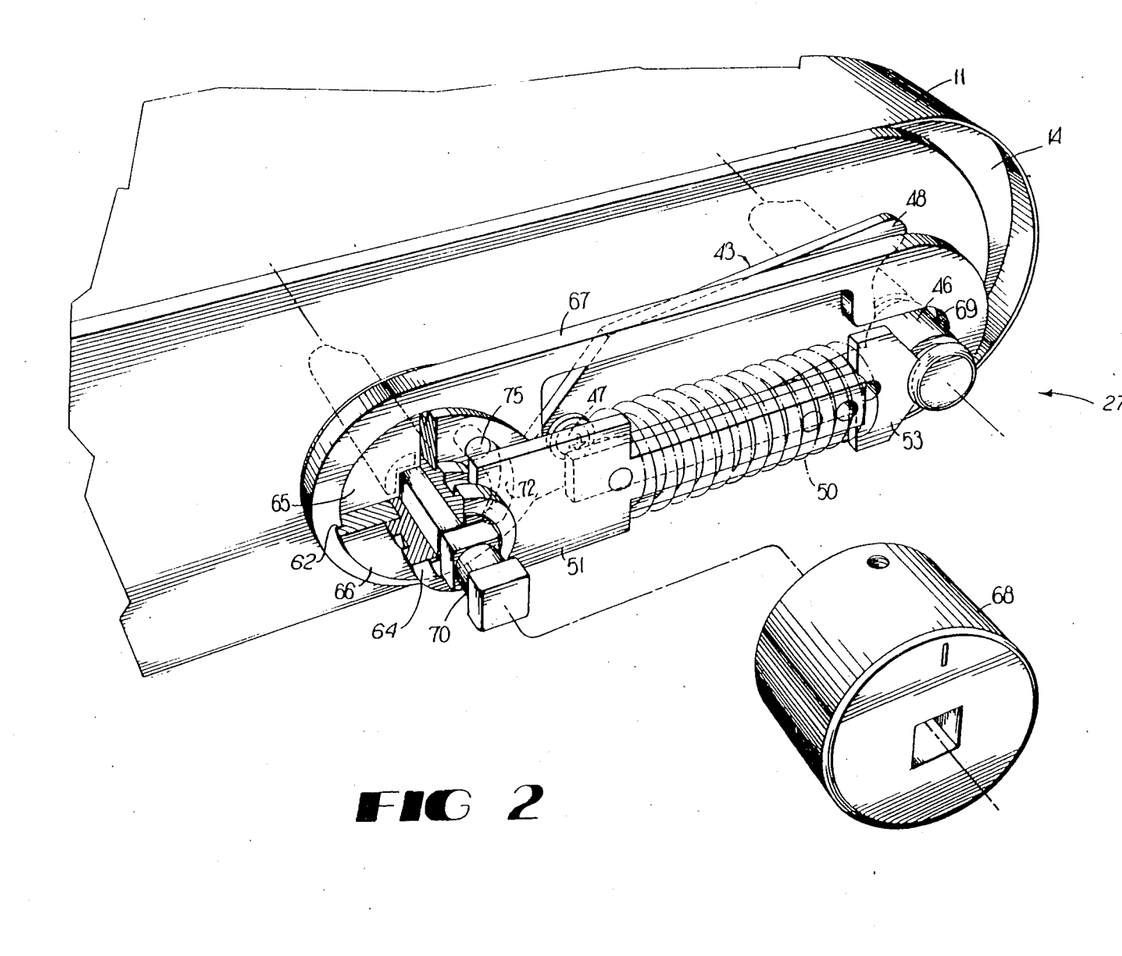
FIG. 2 is a perspective representation of a tensioning and belt release device.

FIG. 2 is a more isolated and perspective view of the tensioning and belt release device 27. It should be understood that description of device 27 is similar to description of device 29. Therefore, for the sake of brevity, only description of one device 27 will be undertaken.

Figure 3:
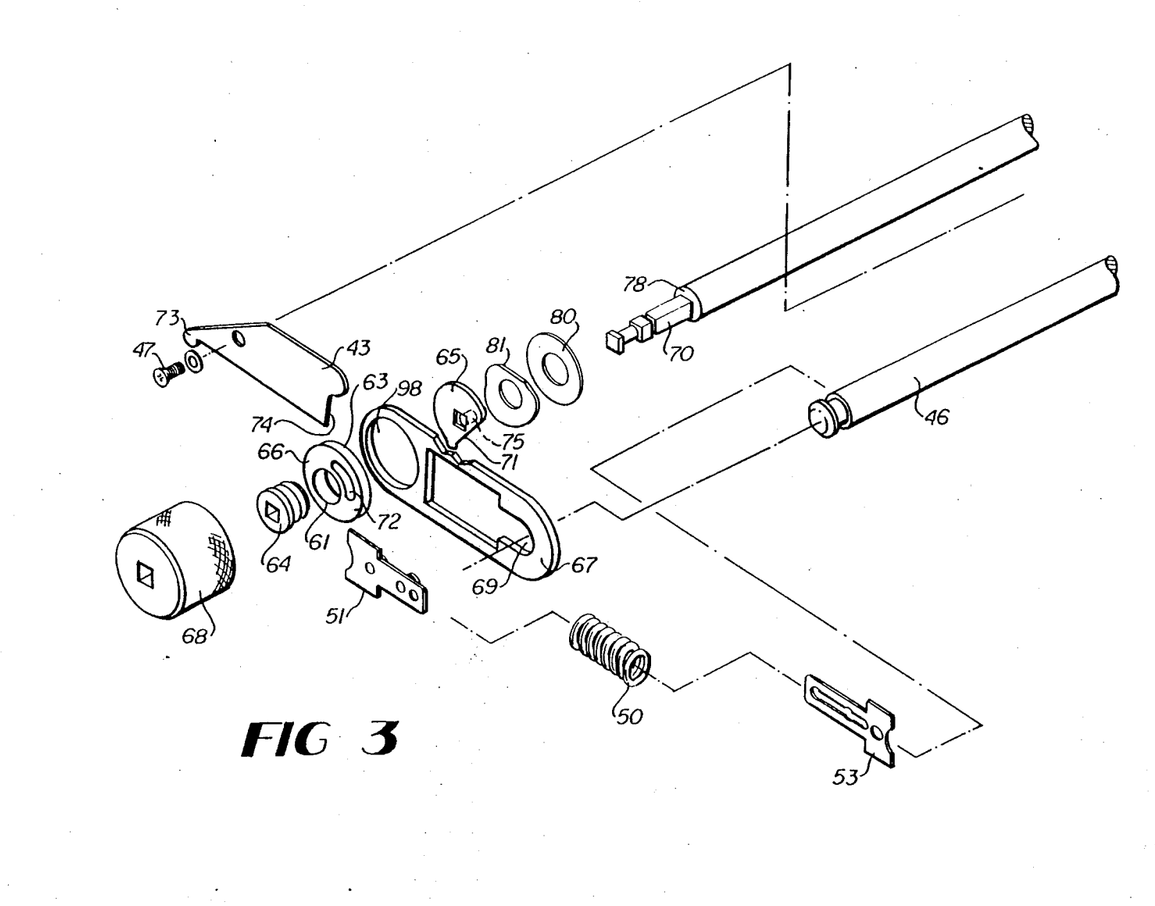
FIG. 3 is an exploded view of a tensioning and belt release device.

Referring now to FIGS. 2 and 3, idler shaft 46 is the center axis of idler roller 14 around which photoreceptor belt 11 travels. Shaft 70 does not support a belt roller, Shaft 70 is free to rotate about its longitudinal axis, but is restricted from moving along its longitudinal axis or from moving radially. The longitudinal axis of shaft 70 is substantially parallel to the longitudinal axis of shaft 46. A substantially length of shaft 70 is circular in transverse cross section, but at each of its end, it has been machined by means known in the art to assume a substantially square transverse cross section. As will be discussed later in this application, various elements which are attached to each ends of shaft 70, which have correspondingly-square shaped holes which allow these elements to be fixed to shaft 70 without being allowed to rotate about shaft 70. The elements so attached to each end of shaft 70 are pegged release cam 65, collar 64 and knob 68.

The relative positioning of elements onto one end of shaft 70 may be understood by reference to FIG. 3. A flat washer 80 is positioned against shoulder 78 of shaft 70, and is allowed to freely rotate about the longitudinal axis of shaft 70. A spring washer 81 is positioned against flat washer 80, and is likewise free to rotate about the longitudinal axis of shaft 70. A pegged release cam 65 is positioned against spring washer 81, and has a square aperture which mates with the square longitudinal cross section of shaft 70, and is thus restricted from rotating about shaft 70. Pegged release cam 65 includes a peg 75 which extends away from the belt path along an axis generally parallel to the longitudinal axis of shaft 70. As will be discussed later in this application, peg 75 fits within curved slot 72 defined by retracting cam 66. Retracting plate 67, retracting cam 66, and collar 64 are attached to shaft 70 in the following manner—circular aperture 98 accepts circular boss 63 extending from retracting cam 66, such that boss 63 is captured and is free to rotate within circular aperture 98. Shoulder 62 (see FIG. 2) of retracting cam 66 is positioned against the outer primary planer surface of retracting plate 67. Collar 64 has an outer peripheral surface rotatably fitting within a circular aperture 61 of retracting cam 66, and itself defines a square aperture which accepts the previously-discussed square transverse cross section of shaft 70. Retracting cam 66 is free to rotate relative to collar 64 about the longitudinal (and rotational) axis of shaft 70, but is restricted to move along the longitudinal axis of shaft 70 relative to collar 64 by means known in the art. Therefore, it may be seen that collar 64 is not free to rotate about the longitudinal axis of shaft 70, but retracting cam 66 is free to rotate about the longitudinal axis of shaft 70, as retracting cam may rotate relative to collar 64. Knob 68 is fixed to end of shaft 70, as it defines a square aperture which accepts the square transverse cross section of shaft 70. By manually rotating knob 68, it may be seen that shaft 70, and all the previously-discussed elements rotationally locked to it, are likewise rotated.

Retracting plate 67 has two apertures, 98 and 99, through which shafts 70, 46, respectively, pass. Aperture 99 includes a guide slot 69 in which shaft 46 can slidably move in a left or right direction only, when viewed as in FIGS. 4A–4C. Aperture 98 is circular and accepts a circular boss 63 which extends from retracting cam 66, such that retracting cam 66 may rotate relative to retracting plate 67 about an axis passing through the center of aperture 98, this axis being substantially normal to the primary planar surface of the retracting plate 67, and substantially parallel but not common, to the rotational axis of shaft 70.

Linkages 51 and 53 are slidably linked together to form an expandable bar between shaft 70 and shaft 46 with a spring between the linkages. Compressive force from spring 50, through linkage 53, forces shaft 46 to the right (as viewed in FIGS. 4A–4C) and away from shaft 70. Tensioning cam 43 is affixed relative to the frame of the electrophotographic machine by screw 47, such that tensioning cam 43 may rotate around the axis of the center of screw 47. Tensioning cam 43 defines a cam surface 74 which is in contact with shaft 46. The cam surface 74 may contact a smoother surface of shaft 46, or may contact the shaft in a slot, if desired.

Operation of the tension maintaining feature of the preferred embodiment is now discussed. As belt 11 expands from age, wear, heat, or other factors, spring 50 pushes out on linkage 53 thereby pushing shaft 46, and consequently roller 14 out to accommodate the expansion of belt 11. Tensioning cam 43 drops by gravity and prevents shaft 46 from retracting due to the force of belt 11. This is especially important should belt 11 subject to occasional or periodic shock. Thus, spring 50 and tensioning cam 43 combine together to form the tension mechanism to keep belt 11 maintained under proper (or desired) tension.

The cam surface 74 of tensioning cam 43 is machined such that when the cam is installed, a line drawn from the center of shaft 46 to the contact point between shaft 46 and the cam surface 74 of cam 43 will always be approximately 8°) above a line drawn from the same center of shaft 46 to the center of screw 47. Both shaft 46 and cam 43 are made of steel in the preferred embodiment. Although other angular configurations are contemplated under the present invention, it should be understood that the vertical component of the friction force between steel cam 43 and steel shaft 46 should exceed the vertical force component of the compression of the belt, such that after gravity has caused cam 43 to drop into a new position, cam 43 cannot be forced upward by shaft 46. A nose 48 extends from cam 43 above the cam surface 74. After the belt has expanded so far that the nose 48 of the cam is resting on the shaft, the registration will become blurry and unclear due to the fact that the cam can no longer keep proper tension upon the belt. The loss of quality in the resulting copies indicates to the operator it is time to replace the belt or make other necessary adjustments.

Figure 4A:
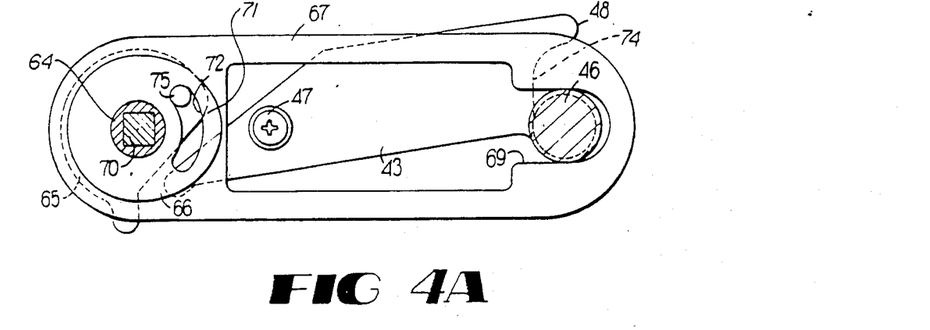
FIGS. 4A, 4B, and 4C are illustrative views showing the operation of the belt release feature of the device shown in FIGS. 2-3.
Figure 4B:
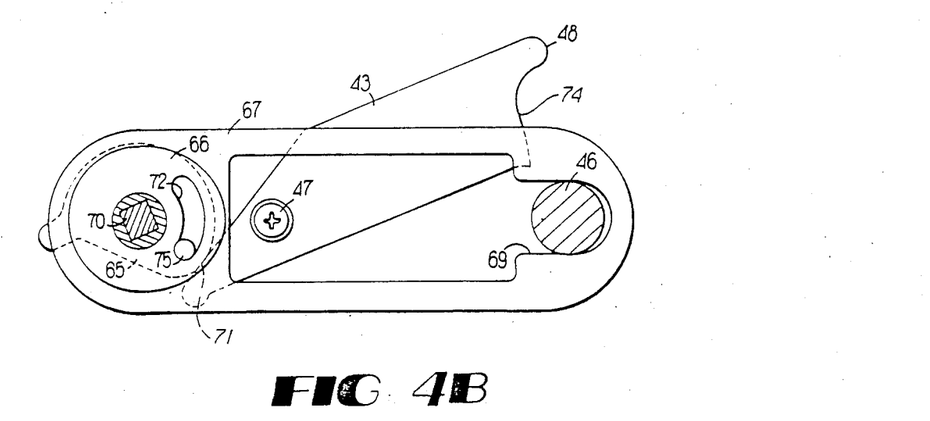
Figure 4C:
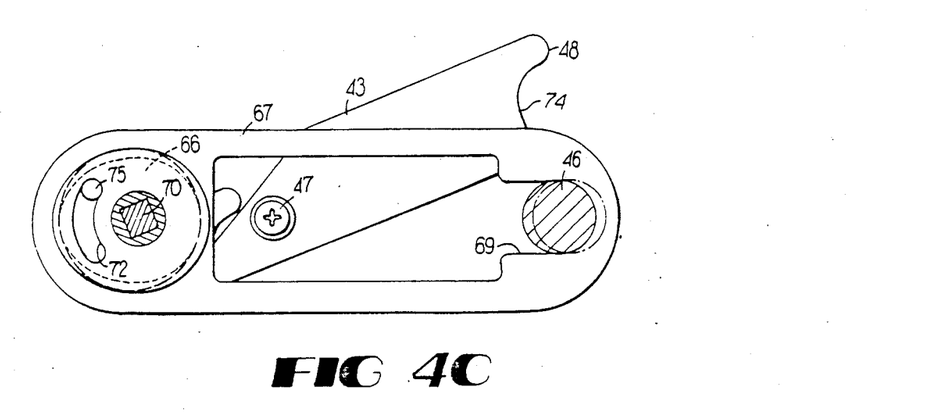
Figure 5A:
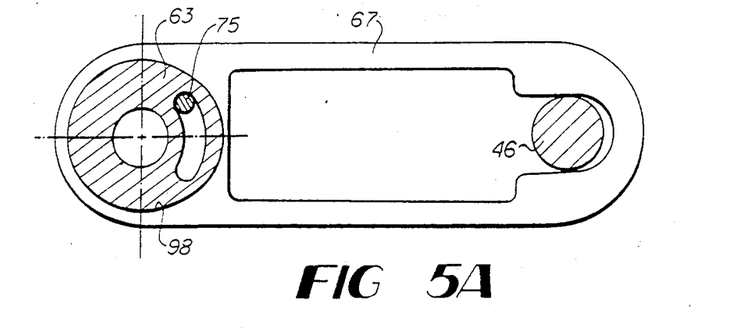
FIGS. 5A, 5B, and 5C are further illustrative views showing the operation of the belt release feature of the device shown in FIGS. 2-3.
Figure 5B:
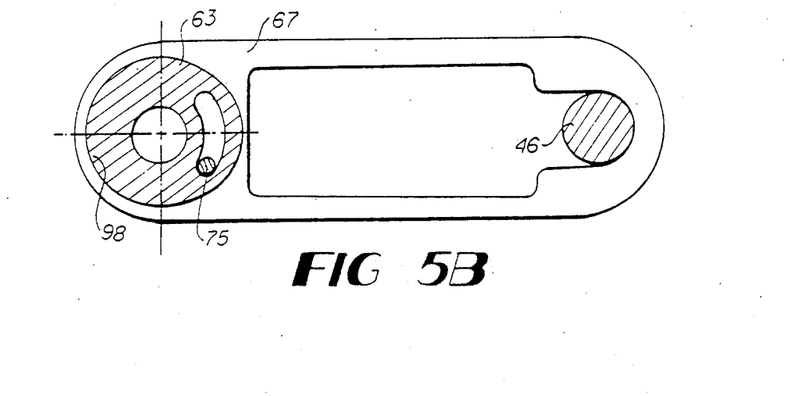
Figure 5C:
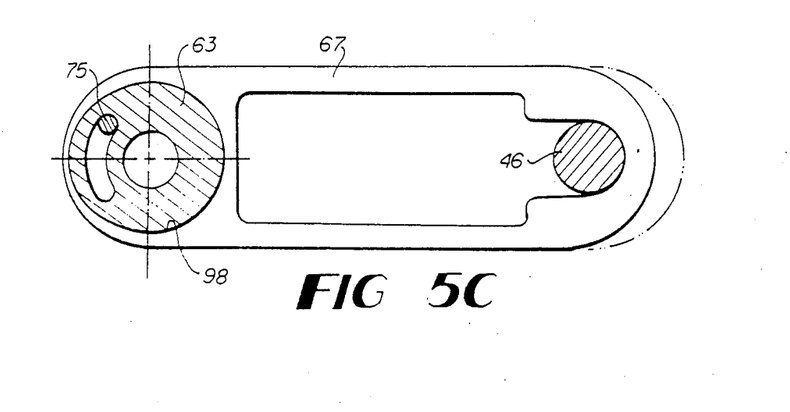

Referring to FIGS. 4A, 4B, and 4C, and also FIGS. 5A, 5B, and 5C, the operation of the release feature of the preferred embodiment is now discussed. In FIG. 4A, the tensioning mechanism is in normal operating position. Spring 50 (not shown) is pushing on shaft 46 and cam 43 takes up any slack afforded by belt 11.

To release the belt, knob 68 (shown in FIG. 2) is rotated in a clockwise direction for approximately 90 degrees until the position shown in FIG. 4B. For purposes of clarity, knob 68 is not shown, but is should be understood that knob 68 is rigidly affixed relative to shaft 70. It should also be understood that as knob 68 turns shaft 70, so also must pegged release cam 65 and collar 64 turn. Retracting cam 66 does not have to turn as collar 64 is free to rotate within and relative to it. During approximately the first 90 degrees of rotation of the shaft 70, cam surface 71 of pegged release cam 65 comes into contact with the end 73 of cam 43, end 73 being opposite the cam surface 74 of cam 43 contacting shaft 46. As end 73 is pushed down, it may be that as cam 43 pivots about screw 47, the cam surface 74 is disengaged from its position against shaft 46.

After cam 43 is disengaged from shaft 46, shaft 46 may be drawn back against the compressive force of spring 50, to allow slack to develop in belt 11 in order that it may ultimately be removed. This is accomplished by pulling back on shaft 46 by plate 67, which itself may be retracted by further rotation of shaft 70, due to the offset nature of retracting cam 66. FIG. 4C shows the orientation of the various components after knob 68 has been rotated from 90 degrees to 270 degrees from its starting position. After approximately the first 90 degrees of rotation, peg 75 "bottoms out" in curved slot 72 of retracting cam 66, and begins rotating retracting cam 66 about shaft 70. As the boss 63 has its center to the right of the center of shaft 70, it may be seen that as the retracting cam 66 is rotated, the center of the boss moves from right to left (and also down and then up somewhat). This is illustrating shown in FIGS. 5A-C, which correspond to FIGS. 4A-C. As the boss slidably rotates within aperture 98 of plate 67, it may therefore be seen that plate 67 is drawn from right to left, toward shaft 70. As plate 67 moves to the left, shaft 46 bottoms out in retract slot 69 thus drawing shaft 46 to the left, and toward shaft 70. Since cam 43 has previously been moved out of the way, shaft 46 can be moved against the compressive force of spring 50 to release the tension upon the belt. As the shaft 70 is rotated to the position shown in FIG. 4C, it may be seen that shaft 46 is drawn toward shaft 70 to a point where preferably the belt 11 or roller 14 may be withdrawn.

As previously discussed, tensioning and belt release device 27 operates in conjunction with a similar device situated on the other side of the belt path. It should be understood that such devices operate independently when performing their tensioning functions, but operate simultaneously when performing their quick release functions. This is due to the fact that the tensioning cams 43 operate only under the influence of gravity, whereas the pegged release cams 65 operate responsive to the rotation of shaft 70. As both pegged release cams 65 are attached to the same shaft 70, as one rotates, so will the other.

From the foregoing description of the preferred embodiment, and alternate embodiments, it will be appreciated that the present invention overcomes the drawbacks of the prior art and meets the objects of the invention cited here and above. In view of the teachings of the specification, other alternative embodiments will suggest themselves to those skilled in the art and therefore the scope of the present invention is to be limited only by the claims below.

We claim:
1. A device for supporting an endless belt used in an electrophotographic print engine, comprising:
a frame;
an endless belt;
a drive roller for supporting said belt, said drive roller being operatively associated with said frame;
an idler roller for supporting said belt;
an idler shaft for supporting said idler roller, said idler shaft being mounted relative to said frame for travel along a path segment such that if said idler shaft travels in a first direction along said path segment, said belt is placed in progressively greater tension, and if said idler shaft travels along said path segment in a second direction opposite to said first direction, said belt is placed in progressively lesser tension;
a second shaft mounted in operable association with said frame such that said second shaft may rotate about its longitudinal axis relative to said frame;
means for urging said idler roller in said first direction, such that said endless belt is maintained in tension during operation of said print engine;
a tensioning cam pivotably attached to said frame, said tension cam defining a cam surface segment, said segment configured to be in contact with said idler shaft such that said cam allows said idler roller mounted upon said idler shaft to travel in said first direction, but not in said second direction;
a pegged release cam mounted for rotation with said second shaft during nonoperation of said print engine in order to replace said endless belt, said pegged release cam including a peg and also including a cam surface for selectively contacting, pivoting and disengaging said tensioning cam upon rotation of said pegged release cam;
a retracting cam mounted for rotation about said second shaft, said retracting cam including an arcuate slot for receiving said peg, said retracting cam also defining a substantially cylindrical boss having a longitudinal axis substantially parallel but offset relative to said second shaft;
a retracting plate defining a substantially circular aperture configured to rotatably accept said substantially circular boss of said retracting cam, and also defining a second aperture configured to encircle said idler shaft;
such that as said second shaft is rotated in a first direction, said peg of said pegged release cam disengages said tensioning cam, and thereafter engages said retracting cam such that said reacting cam retracts said retracting plate such that said idler shaft travels in said second direction such that said endless belt is slackened.

2. A device for supporting an endless belt used in an electrophotographic print engine, comprising:
a frame;
an endless belt;
a drive roller for supporting said belt, said drive roller being operatively associated with said frame;
an idler roller for supporting said belt;
an idler shaft for supporting said idler roller, said idler shaft being mounted relative to said frame for travel along a path segment such that if said idler shaft travels in a first direction along said path segment, said belt is placed in progressively greater tension, and if said idler shaft travels along said path segment in a second direction opposite to said first direction, said belt is placed in progressively lesser tension;
a second shaft mounted in operable association with said frame such that said second shaft may rotate about it longitudinal axis relative to said frame;
means for urging said idler roller in said first direction, such that said endless belt is maintained in tension during operation of said print engine;
a tensioning cam pivotably attached to said frame, said tensioning cam defining a cam surface segment, said segment configured to be in contact with said idler shaft such that said cam allows said idler shaft to travel in said first direction, but not in said second direction;

a pegged release cam mounted for rotation with said second shaft during nonoperation of said print engine in order to replace said endless belt, said pegged release cam including a peg having a longitudinal axis substantially parallel but offset relative to said second shaft, said pegged release cam also including a cam surface for successively contacting, pivoting and disengaging said tensioning cam upon rotation of said pegged release cam;

a retracting cam mounted for rotation relative to said second shaft about said longitudinal axis of rotation of said second shaft, said retracting cam defining a closed-ended arcuate slot for receiving said peg, said arcuate slot configured to allow said peg to travel a finite distance within said arcuate slot during a segment of rotation of said pegged release cam relative to said extracting cam without interfering with said slot, said arcuate slot also configured to interfere with said peg at the beginning and end of travel through said segment of rotation such that said peg interferes with said slot and causes said retracting cam to rotate with said pegged release cam, said retracting cam also defining a substantially cylindrical boss having a longitudinal axis substantially parallel but offset relative to said second shaft;

a retracting plate defining a substantially circular aperture configured to rotatably accept said substantially circular boss of said retracting cam, and also defining a second aperture configured to enclose said idler shaft, such that as said second shaft is rotated in a first direction, said pegged release cam disengages said tensioning cam and thereafter engages said retracting cam, such that said retracting cam rotates with said second shaft and retracts said retracting plate due to said offset relation such that said retracting plate urges said idler shaft in said second direction and said endless belt is slackened.

* * * * *